United States Patent
Kanzaki et al.

(10) Patent No.: US 9,478,358 B2
(45) Date of Patent: Oct. 25, 2016

(54) MULTILAYER CERAMIC CAPACITOR

(71) Applicant: Murata Manufacturing Co., Ltd., Nagaokakyo-shi, Kyoto-fu (JP)

(72) Inventors: Taisuke Kanzaki, Nagaokakyo (JP); Akio Masunari, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/732,849

(22) Filed: Jun. 8, 2015

(65) Prior Publication Data

US 2015/0364259 A1  Dec. 17, 2015

(30) Foreign Application Priority Data

Jun. 12, 2014 (JP) .................. 2014-121659
Feb. 5, 2015 (JP) .................. 2015-020894

(51) Int. Cl.
| | |
|---|---|
| C04B 35/468 | (2006.01) |
| H01G 4/30 | (2006.01) |
| H01G 4/008 | (2006.01) |
| B32B 18/00 | (2006.01) |
| C04B 35/638 | (2006.01) |
| H01G 4/12 | (2006.01) |

(52) U.S. Cl.
CPC ............ *H01G 4/30* (2013.01); *B32B 18/00* (2013.01); *C04B 35/4682* (2013.01); *C04B 35/638* (2013.01); *H01G 4/0085* (2013.01); *H01G 4/1227* (2013.01); *C04B 2235/3206* (2013.01); *C04B 2235/3224* (2013.01); *C04B 2235/3239* (2013.01); *C04B 2235/3267* (2013.01); *C04B 2235/3418* (2013.01); *C04B 2235/6021* (2013.01); *C04B 2235/6562* (2013.01); *C04B 2237/346* (2013.01); *H01G 4/1263* (2013.01)

(58) Field of Classification Search
CPC ..................... C04B 2235/768; C04B 35/468
See application file for complete search history.

(56) References Cited

U.S. PATENT DOCUMENTS 4,386,985 A * 6/1983 Dirstine .............. C04B 35/4682
                                                                156/89.14
5,335,139 A † 8/1994 Nomura (Continued)

FOREIGN PATENT DOCUMENTS

| JP | 2002-266639 A | 9/2002 |
| JP | 2012-033556 A | 2/2012 |
| KR | 2000-0051387 A | 8/2000 |

*Primary Examiner* — Noah Wiese
(74) *Attorney, Agent, or Firm* — Arent Fox LLP

(57) ABSTRACT

A multilayer ceramic capacitor that includes dielectric layers made mainly of a perovskite compound containing Ba and Ti and optionally Zr and Hf, and inner electrodes having an average thickness of approximately 0.5 µm or less. The Mg content of the dielectric layers is approximately in the range of $0 \leq Mg \leq 0.4$ (parts by mole) based on a total of 100 parts by mole of Ti, Zr, and Hf. The proportion of Mg-containing defects in the inner electrodes is approximately 20% or more.

5 Claims, 3 Drawing Sheets

(56) References Cited

U.S. PATENT DOCUMENTS

| | | | |
|---|---|---|---|
| 6,162,277 A | 12/2000 | Toshima et al. | |
| 6,380,116 B1* | 4/2002 | Okamatsu | H01G 4/1227 361/321.4 |
| 6,645,897 B2* | 11/2003 | Nakamura | B32B 18/00 361/306.3 |
| 7,381,672 B2† | 6/2008 | Hiramatsu | |
| 7,413,699 B2* | 8/2008 | Miura | B32B 18/00 264/619 |
| 2003/0199385 A1* | 10/2003 | Kamiya | B32B 18/00 501/137 |
| 2004/0176240 A1* | 9/2004 | Oobuchi | C04B 35/468 501/139 |
| 2010/0109505 A1* | 5/2010 | Rosier | H01J 65/046 313/244 |
| 2010/0195265 A1* | 8/2010 | Nakamura | C04B 35/03 361/321.4 |
| 2012/0026642 A1 | 2/2012 | Kaneko et al. | |
| 2013/0038982 A1* | 2/2013 | Lee | H01G 4/008 361/303 |
| 2013/0294007 A1† | 11/2013 | Okamoto et al. | |
| 2013/0321978 A1* | 12/2013 | Lee | H01G 4/30 361/301.4 |

\* cited by examiner
† cited by third party

MULTILAYER CERAMIC CAPACITOR

BACKGROUND OF THE INVENTION

1. Field of the Invention

The present invention relates to a multilayer ceramic capacitor, in particular, for example, a multilayer ceramic capacitor having a capacitor main body composed of alternately stacked dielectric layers and internal electrodes.

2. Description of the Related Art

Multilayer ceramic capacitors are widely used as small and high-capacity electronic components. However, smaller, higher-capacity, and more reliable multilayer ceramic capacitors are in demand. As a material for dielectric layers for use in the capacitor main body of multilayer ceramic capacitors, a dielectric ceramic composition has been disclosed containing a main component including barium titanate, a first accessory component including an AE oxide (where AE is at least one selected from Mg, Ca, Ba, and Sr), and a second accessory component including an R oxide (where R is at least one selected from Y, Dy, Ho, and Er), the proportions of the accessory components to 100 moles of the main component meeting the following conditions: the first accessory component, 0 moles <the first accessory component <0.1 moles; the second accessory component, 1 mole<the second accessory component <7 moles.

Such a dielectric ceramic composition has high relative permittivity, long-lasting insulation resistance, and capacity-temperature characteristics meeting the EIA X8R specifications (−55° C. to 150° C.; ΔC/C within ±15%) and can be fired in a reducing atmosphere. The use of such a dielectric ceramic composition makes a multilayer ceramic capacitor smaller and higher-capacity, providing a thin-film small-sized multilayer ceramic capacitor (see Japanese Unexamined Patent Application Publication No. 2002-255639).

SUMMARY OF THE INVENTION

For the production of a multilayer ceramic capacitor, a ceramic green sheet made of a dielectric material based on a dielectric ceramic composition and an electroconductive paste containing an electroconductive material, such as Ni, are prepared. Printing the electroconductive paste on the ceramic green sheet and firing a multilayer body in which this ceramic green sheet has been shaped into layers yields a capacitor main body. Forming an outer electrode on both end faces of this capacitor main body produces a multilayer ceramic capacitor.

Reducing the printing thickness of the electroconductive paste to thin the inner electrodes, however, makes it more likely defects, regions where the inner electrodes are discontinuous, form during the firing of the multilayer body. Any defect in an inner electrode affects the inner electrode coverage (the proportion of the region covered with the inner electrodes), resulting in reduced electrostatic capacity.

The primary object of the present invention is therefore to provide a multilayer ceramic capacitor having thin inner electrodes with reduced loss of inner electrode coverage.

According to preferred embodiments of the present invention, a multilayer ceramic capacitor has a plurality of dielectric layers containing a perovskite compound containing Ba and Ti and optionally Zr and Hf and a plurality of inner electrodes located in a plurality of interfaces between the dielectric layers. The average thickness of the inner electrodes is approximately 0.5 μm or less. The Mg content of the dielectric layers is approximately in the range of 0≤Mg≤0.4 (parts by mole) based on a total of 100 parts by mole of Ti, Zr, and Hf. The proportion of defects in which Mg is present in the inner electrodes, the defects referring to a region where an inner electrode is discontinuous, is expressed as follows:

(the number of the defects in which Mg is present/ the total number of the defects)×100 (%)≥approximately 20 (%).

In such a multilayer ceramic capacitor, it is preferred that the inner electrodes be made from an electroconductive paste containing Ni as an electroconductive material and Mg as an accessory component.

An embodiment of the present invention provides a multilayer ceramic capacitor having thin inner electrodes with reduced loss of inner electrode coverage.

Other features, elements, characteristics and advantages of the present invention will become more apparent from the following detailed description of preferred embodiments of the present invention with reference to the attached drawings.

DESCRIPTION OF THE PREFERRED EMBODIMENTS

Figure 1:
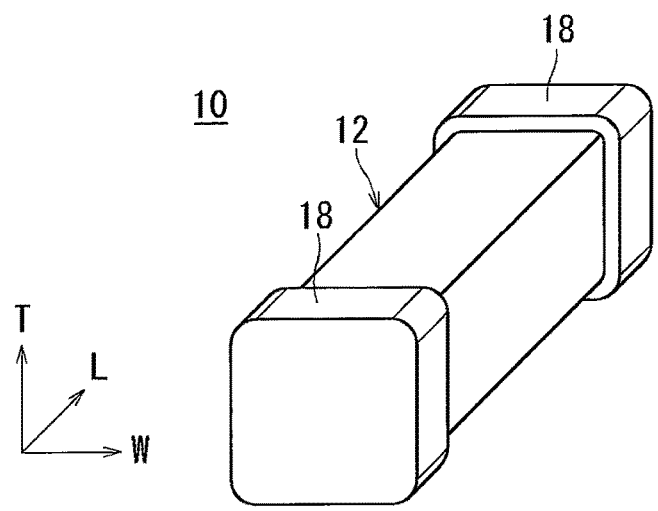
FIG. 1 is a perspective view of an example of a multilayer ceramic capacitor.
Figure 2:
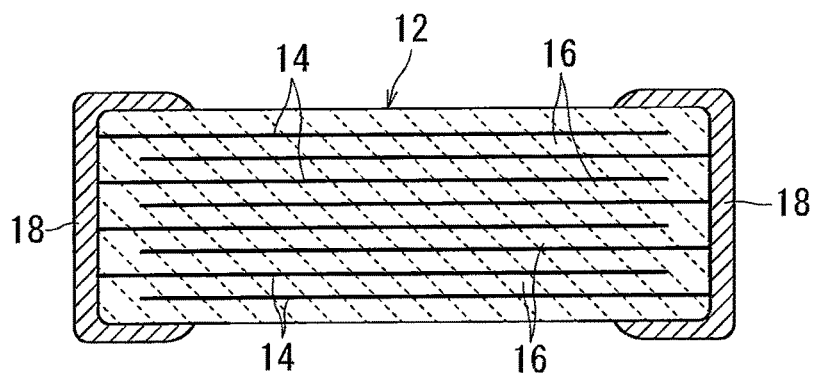
FIG. 2 is a schematic diagram illustrating the internal structure of the multilayer ceramic capacitor illustrated in FIG. 1.

FIG. 1 is a perspective view of an example of a multilayer ceramic capacitor. The multilayer ceramic capacitor 10 includes a capacitor main body 12. The capacitor main body 12 can have, for example, a substantially cuboid shape having a length direction (direction L), a width direction (direction W), and a thickness direction (direction T). As illustrated in FIG. 2, the capacitor main body 12 has a structure in which inner electrodes 14 and dielectric layers 16 are alternately stacked in direction T of the capacitor main body 12. The main component of the dielectric layers 16 is a perovskite compound containing Ba and Ti and optionally Zr and Hf. The dielectric layers 16 can be made of, for example, a material containing $BaTiO_3$ as main component and Si, Dy, Mn, V, Mg, etc. as accessory components. The Mg content is approximately in the range of 0≤Mg≤0.4 parts by mole based on a total of 100 parts by mole of Ti, Zr, and Hf in the dielectric layers.

The inner electrodes 14 can be formed through, for example, firing of an electroconductive paste containing Ni as an electroconductive material and Mg as an accessory component, having an average thickness of approximately 0.5 µm or less. The inner electrodes 14 have defects, regions where the inner electrodes are discontinuous, formed during their production process. Mg originating from the electroconductive paste exists in some defects and does not in others. The proportion of Mg-containing defects in the inner electrodes 14 is approximately 20% or more, i.e., (the number of Mg-containing defects/the total number of defects)×100 (%)≥approximately 20 (%). Such a structure can be attained through adjustment of the Mg content of the material for the inner electrodes 14 and the material for the dielectric layers 16.

The multiple inner electrodes 14 are formed to face each other in the multilayer body. Adjacent inner electrodes 14 extend to reach the end faces opposite in direction L of the capacitor main body 12. In other words, adjacent inner electrodes 14 extend to reach opposite end faces of the capacitor main body 12 alternately. Outer electrodes 18 are formed on these end faces of the capacitor main body 12, and the inner electrodes 14, reaching these end faces, are coupled to the outer electrodes 18. An electrostatic capacity is therefore formed between the two outer electrodes 18.

For the production of this multilayer ceramic capacitor 10, the material for the dielectric layers 16 is prepared. First, high-purity $BaCO_3$ and $TiO_2$ are prepared and compounded to make a specified Ba:Ti ratio. Wet-blending the compounded powder in a ball mill until uniform dispersion and then drying the obtained mixture provides a conditioned powder. Calcining this conditioned powder at a temperature of approximately 1000° C. to approximately 1200° C. yields a powder of $BaTiO_3$ as main component with an average particle diameter of approximately 0.15 µm.

Powders of accessory components such as $SiO_2$, $Dy_2O_3$, $MnO_2$, and $V_2O_5$ are also prepared. Adding such quantities of these powders as to make specified relative quantities of Si, Dy, Mn, and V to Ti to the main component yields a mixed powder. Elements such as Mg may be contained as accessory components. Wet-blending this mixed powder in a ball mill until uniform dispersion and then drying the obtained mixture yields a raw dielectric ceramic material.

An electroconductive paste from the inner electrodes 14 will be made is then prepared. A powder as an additive to the electroconductive paste (called a common material) is first conditioned. A $BaTiO_3$ powder is mixed with $Dy_2O_3$, MgO, and MnO powders, and the resulting mixture is calcined at approximately 800° C. to provide the powder additive. The quantities of $Dy_2O_3$ and MnO added are adjusted to make specified proportions of Dy and Mn to the Ti content of $BaTiO_3$.

Specified proportions of a Ni powder as an electroconductive material and the powder additive as a common material are dispersed in a solution of ethylcellulose in terpineol as an organic vehicle using a three-roll mill. In this way, an electroconductive paste for the inner electrodes is produced. The quantities of MgO added to the inner electrodes 14 and the dielectric layers 16 are adjusted to ensure the Mg content of the dielectric layers 16 of the finished multilayer ceramic capacitor 10 is approximately in the range of 0≤Mg≤0.4 parts by mole based on a total of 100 parts by mole of Ti, Zr, and Hf.

Wet-blending the raw dielectric ceramic material with a polyvinyl butyral-based binder, a plasticizer, and ethanol as organic solvent in a ball mill provides ceramic slurry. Shaping this ceramic slurry into a sheet using lip extrusion provides a substantially rectangular ceramic green sheet.

Applying the electroconductive paste containing Ni as primary electrical conductor to this ceramic green sheet using screen printing provides an electrode paste coating for use as an inner electrode 14. Stacking multiple ceramic green sheets each having an electroconductive paste coating, with the coatings on adjacent green sheets reaching opposite ends of the sheets, and placing a ceramic green sheet having no electroconductive paste coating on both sides of the resulting stack provides a raw multilayer body for use as the capacitor main body 12.

Then this multilayer body is heated in a $N_2$ atmosphere at a temperature of approximately 800° C. for approximately 3 hours so that the binder is burnt. The multilayer body is then fired under the following conditions: rate of temperature increase, approximately 40° C./sec or more; maximum temperature, approximately 1100° C. to approximately 1300° C.; furnace atmosphere, approximately 1 ppb to approximately 1% oxygen partial pressure. Allowing the fired multilayer body to cool to room temperature without holding time and then firing the cooled multilayer body again with the maximum temperature approximately in the range of 1000° C. to 1100° C. yields a sintered multilayer body, i.e., the capacitor main body 12.

Firing the multilayer body also produces defects in the inner electrodes 14. The Mg content of the raw dielectric ceramic material and that of the electroconductive paste are adjusted so that the proportion of Mg-containing defects in the inner electrodes 14 is approximately 20% or more, i.e., (the number of Mg-containing defects/the total number of defects)×100 (%)≥approximately 20 (%).

A Cu paste containing a glass frit is applied to both end faces of the resulting capacitor main body 12. Firing the applied paste in a $N_2$ atmosphere at a temperature of approximately 800° C. produces outer electrodes 18 coupled to the inner electrodes 14. In this way, a multilayer ceramic capacitor 10 is produced.

A multilayer ceramic capacitor 10 obtained in this way has inner electrodes 14 in which at least a certain proportion of defects contain Mg. This reduces the loss of coverage associated with the occurrence of additional defects in the inner electrodes 14. The reason for this is presumably that a Mg—Ni composite oxide formed in the portion where Mg is present inhibits the growth of Ni grains and, therefore, reduces the occurrence of defects in the inner electrodes associated with grain growth.

When the dielectric layers 16 have a high Mg content, furthermore, Ni in the inner electrodes 14 diffuses into the dielectric layers 16 to form a composite oxide with Mg in the dielectric layers 16, making it more likely that defects occur in the inner electrodes 14. The Mg content of the dielectric layers 16 in this multilayer ceramic capacitor 10 is low, which prevents the diffusion of Ni in the inner electrodes 14 into the dielectric layers 16 and associated formation of defects in the inner electrodes 14. As a result, the loss of the inner electrode 14 coverage is reduced.

If the thickness of the inner electrodes 14 exceeds approximately 0.5 µm, the loss of the inner electrode 14 coverage is small regardless of the Mg content. This advantage of reduced loss of the inner electrode 14 coverage obtained through the adjustment of Mg content is therefore significant when the thickness of the inner electrodes 14 is approximately 0.5 µm or less.

EXAMPLE 1

A raw dielectric ceramic material was obtained through the following process. Powders of high-purity $BaCO_3$ and $TiO_2$ were compounded in a Ba:Ti ratio of approximately 1:1. The compounded powder was wet-blended in a ball mill until uniform dispersion, and the obtained mixture was dried. The obtained conditioned powder was calcined at a temperature of approximately 1000° C. In this way, a powder of $BaTiO_3$ as main component was obtained with an average particle diameter of approximately 0.15 μm.

Then powders of $SiO_2$, $Dy_2O_3$, $MnO_2$, and $V_2O_5$ as accessory components were prepared. Such quantities of the powders of $SiO_2$, $Dy_2O_3$, $MnO_2$, and $V_2O_5$ as to make specified relative quantities of Si, Dy, Mn, and V to 100 parts by mole of Ti (Si, approximately 2 parts by mole; Dy, approximately 1 part by mole; Mn, approximately 0.5 parts by mole; V, approximately 0.1 parts by mole) to the main component powder. To the obtained mixed powder, a MgO powder was added to make the Mg content presented in Table. The resulting mixed powder was wet-blended in a ball mill until uniform dispersion, and the obtained mixture was dried. In this way, a raw dielectric ceramic material was obtained.

An electroconductive paste for the formation of inner electrodes was also obtained, through the following process. A powder additive for use as a common material in the electroconductive paste was conditioned by mixing a $BaTiO_3$ powder having an average particle diameter of approximately 0.02 μm with a $Dy_2O_3$ powder having an average particle diameter of approximately 0.1 μm, a MgO powder having an average particle diameter of approximately 0.1 μm, and a MnO powder having an average particle diameter of approximately 0.1 μm and calcining the resulting mixture at approximately 800° C. The quantities of $Dy_2O_3$ and MnO added were such that the proportions of Dy and Mn to 100 parts by mole of Ti in $BaTiO_3$ were approximately 1 part by mole and approximately 0.5 parts by mole, respectively. The quantity of MgO added was as presented in Table.

Then a Ni powder having an average particle diameter of approximately 0.1 μm and the powder additive were prepared. A solution of ethylcellulose in terpineol as an organic vehicle was also prepared. The prepared powders were dispersed in approximately 50 g of the organic vehicle using a three-roll mill. In this way, an electroconductive paste for the formation of inner electrodes was produced. The quantity of the powder additive was such that the Ti content of the powder additive to 100 parts by mole of Ni in the Ni powder was approximately 3 parts by mole.

Then the raw dielectric ceramic material was wet-blended with a polyvinyl butyral-based binder, a plasticizer, and ethanol as organic solvent in a ball mill to form ceramic slurry. This ceramic slurry was shaped into a sheet using lip extrusion, providing a substantially rectangular ceramic green sheet.

The electroconductive paste containing Ni as major electrical conductor was applied to the obtained ceramic green sheet using screen printing to form an electrode paste coating for use as an inner electrode. Then approximately 300 ceramic green sheets each having an electroconductive paste coating were stacked with the coatings on adjacent green sheets reaching opposite ends of the sheets, and a ceramic green sheet having no electroconductive paste coating was placed on both sides of the resulting stack. In this way, a raw multilayer body for use as a capacitor main body was obtained.

The obtained multilayer body was heated in a $N_2$ atmosphere at a temperature of approximately 800° C. for approximately 3 hours so that the binder was burnt. The multilayer body was then fired under the following conditions: rate of temperature increase, approximately 40° C./sec or approximately 1° C./sec; maximum temperature, approximately 1100° C. to approximately 1300° C.; a reducing furnace atmosphere. The fired multilayer body was allowed to cool to room temperature without holding time and then fired again with the maximum temperature being approximately 1050° C. In this way, a sintered multilayer body, i.e., a capacitor main body, was obtained.

Then a Cu paste containing a glass frit was applied to both end faces of the capacitor main body and fired in a $N_2$ atmosphere at a temperature of approximately 800° C. to form outer electrodes electrically coupled to the inner electrodes. Sample multilayer ceramic capacitors were obtained in this way.

The outer dimensions of the obtained multilayer ceramic capacitors (including the outer electrodes) were as follows: length L, approximately 0.6 mm; width W, approximately 0.3 mm. The thickness of one ceramic layer was approximately 0.45 μm, and the number of stacked inner electrodes was approximately 300. The thickness of the inner electrodes was as summarized in Table. The thickness of the outermost ceramic layers was approximately 20 μm on each side.

The obtained samples (multilayer ceramic capacitors) were observed through the following procedure. A sample placed in the upright position was coated with resin with a side between the length direction (direction L) and thickness direction (direction T) of the sample (an LT side) exposed. The exposed LT side of the sample was polished using a polisher until an LT cross-section was exposed at a depth of approximately ½ the width direction (direction W) of the sample. Then the polished surface was subjected to ion milling to make up for the overpolishing of the edge of the inner electrodes.

Figure 3:
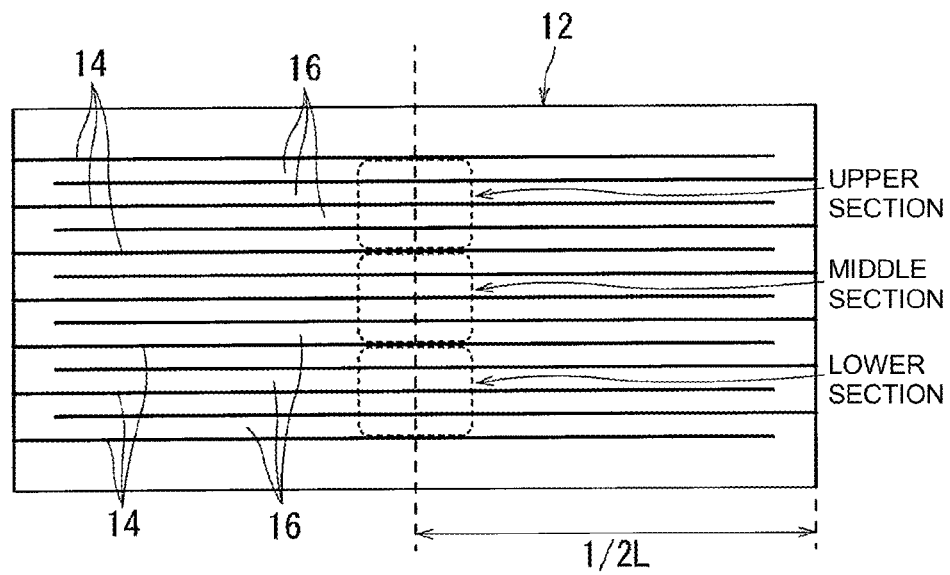
FIG. 3 is a schematic diagram illustrating those regions in a multilayer ceramic capacitor that were used in Examples to measure the thickness of the inner electrodes and to examine the presence of Mg in defects in the inner electrodes.

The thickness of the inner electrodes in polished samples was measured through the following process. As illustrated in FIG. 3, a straight line substantially orthogonally crossing the inner electrodes at a point of approximately ½ direction L on the LT cross-section of a sample was determined. Then using three samples per condition in Table (per Example, Reference Example, or Comparative Example), the region where the inner electrodes were stacked was divided into three sections having equal thicknesses, i.e., upper, middle, and lower sections. In each section, the thickness of randomly selected five inner electrodes was measured along the substantially orthogonal line excluding the outermost inner electrodes, and the average thickness was calculated. Any unmeasurable portion, such as a portion where inner electrodes were missing, was excluded from the measurement. The electrode thickness presented in Table is therefore the average inner electrode thickness of 45 points (3 samples×3 sections×5 electrodes). The measurement of the thickness of inner electrodes was performed using a scanning electron microscope.

The multilayer body of five samples per condition in Table was separated along an inner electrode near the middle in direction T. The exposed inner electrode was microscopically observed and imaged at a magnification of approximately 500×. The inner electrode coverage (the proportion of the region covered with the inner electrode) was quantified through image processing, and the average coverage was calculated. The obtained coverage values are summarized in Table. In Table, examples where the inner electrode coverage was approximately 80% or more are given the result "G" (good), and examples where the inner electrode coverage was less than approximately 80% are given "NG" (not good).

As illustrated in FIG. 3, the region of a sample where the inner electrodes were stacked was divided into three sections having equal thicknesses at a point of approximately ½ direction L of the sample, and the middle portions of the respective sections in direction L were named upper, middle, and lower sections. Each section was observed using WDX near its middle for the presence of Mg in electrode defects. The vertical length of the field of view (in the direction of stacking, or direction T) was such that approximately 10 inner electrodes could be observed in the direction of stacking, and the horizontal length (in the direction perpendicular to the direction of thickness, or direction L) was the same as that in the direction of stacking (direction T). Five samples per condition in Table were observed. The proportion of defects where Mg segregation was observed in Table is therefore the average proportion of Mg-containing defects of 15 points (5 samples×3 sections).

Figure 4:
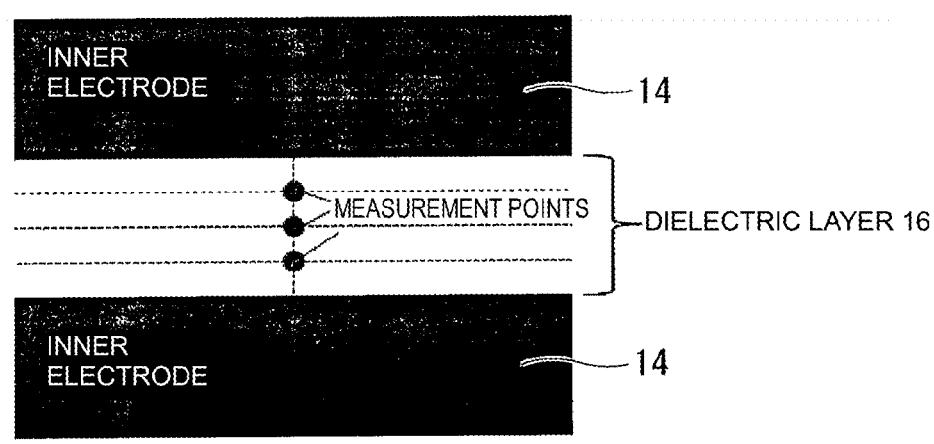
FIG. 4 is a schematic diagram illustrating those measurement points in a multilayer ceramic capacitor that were used in Examples to measure the Mg content of the dielectric layers.

The multilayer body of five samples per condition in Table was polished until its central portion in directions L, W, and T was exposed, and the ceramic dielectric body in the central portion in directions L, W, and T was processed into a thin piece. The Mg content of a dielectric layer in this thin piece of the ceramic dielectric body was measured using STEM-EDX under the following conditions: STEM, JEM-2200FS (JEOL); acceleration voltage, approximately 200 kV; detector (EDS), JED-2300T (JEOL) with an SDD detector having an aperture of 60 mm$^2$; EDS system, Noran System 7; sample thin piece thickness, approximately 100 nm. As illustrated in FIG. 4, a dielectric layer sandwiched between two inner electrodes was measured at three points where the dielectric layer is divided into four sections having equal thicknesses, and the average quantity of detected Mg was calculated. The quantity of Mg detected in dielectric layers presented in Table is therefore the average quantity of detected Mg of 15 measurement points (5 multilayer bodies×3 measurement points).

TABLE

| | Dielectric body Mg contained (mol) | Inner electrodes Mg content of common material (mol) | Process Rate of temperature increase (° C./sec) | Dielectric layers Mg detected (parts by mole) | Inner electrodes Thickness (μm) | Proportion of defects where Mg segregation detected | Characteristics Coverage (%) | Result |
|---|---|---|---|---|---|---|---|---|
| Example 1 | 0 | 1 | 40 | Not detected | 0.5 | 20 | 92 | G |
| Example 2 | 0 | 1 | 40 | Not detected | 0.4 | 25 | 87 | G |
| Example 3 | 0 | 1 | 40 | Not detected | 0.3 | 29 | 83 | G |
| Example 4 | 0.2 | 1 | 40 | 0.2 | 0.5 | 25 | 91 | G |
| Example 5 | 0.2 | 1 | 40 | 0.2 | 0.4 | 23 | 81 | G |
| Example 6 | 0.2 | 1 | 40 | 0.2 | 0.3 | 22 | 80 | G |
| Example 7 | 0.4 | 1 | 40 | 0.4 | 0.5 | 26 | 92 | G |
| Example 8 | 0.4 | 1 | 40 | 0.4 | 0.4 | 24 | 82 | G |
| Example 9 | 0.4 | 1 | 40 | 0.4 | 0.3 | 22 | 81 | G |
| Example 10 | 0.2 | 5 | 40 | 0.2 | 0.5 | 53 | 95 | G |
| Example 11 | 0.2 | 5 | 40 | 0.2 | 0.4 | 55 | 92 | G |
| Example 12 | 0.2 | 5 | 40 | 0.2 | 0.3 | 51 | 90 | G |
| Example 13 | 0.4 | 2 | 40 | 0.4 | 0.5 | 30 | 93 | G |
| Example 14 | 0.4 | 2 | 40 | 0.4 | 0.4 | 31 | 92 | G |
| Example 15 | 0.4 | 2 | 40 | 0.4 | 0.3 | 30 | 90 | G |
| Example 16 | 0.2 | 2 | 40 | 0.2 | 0.5 | 32 | 92 | G |
| Example 17 | 0.2 | 2 | 40 | 0.2 | 0.4 | 31 | 92 | G |
| Example 18 | 0.2 | 2 | 40 | 0.2 | 0.3 | 31 | 90 | G |
| Reference Example 1 | 0 | 1 | 40 | Not detected | 0.7 | 22 | 94 | G |
| Reference Example 2 | 0 | 1 | 40 | Not detected | 0.6 | 24 | 93 | G |
| Reference Example 3 | 0.2 | 1 | 40 | 0.2 | 0.7 | 24 | 93 | G |
| Reference Example 4 | 0.2 | 1 | 40 | 0.2 | 0.6 | 24 | 92 | G |
| Reference Example 5 | 0.4 | 1 | 40 | 0.4 | 0.7 | 23 | 94 | G |
| Reference Example 6 | 0.4 | 1 | 40 | 0.4 | 0.6 | 24 | 92 | G |
| Reference Example 7 | 0.2 | 5 | 40 | 0.2 | 0.7 | 55 | 96 | G |
| Reference Example 8 | 0.2 | 5 | 40 | 0.2 | 0.6 | 54 | 94 | G |
| Reference Example 9 | 0 | 0 | 40 | Not detected | 0.7 | 0 | 92 | G |
| Reference Example 10 | 0 | 0 | 40 | Not detected | 0.6 | 0 | 90 | G |
| Reference Example 11 | 1 | 1 | 40 | 1 | 0.7 | 30 | 92 | G |
| Reference Example 12 | 1 | 1 | 40 | 1 | 0.6 | 28 | 90 | G |
| Reference Example 13 | 0.2 | 5 | 1 | 0.6 | 0.7 | 55 | 98 | G |
| Reference Example 14 | 0.2 | 5 | 1 | 0.6 | 0.6 | 54 | 96 | G |
| Reference Example 15 | 0.6 | 1 | 40 | 0.6 | 0.7 | 28 | 93 | G |
| Reference Example 16 | 0.6 | 1 | 40 | 0.6 | 0.6 | 26 | 91 | G |
| Reference Example 17 | 0.2 | 0.5 | 40 | 0.2 | 0.7 | 9 | 92 | G |
| Reference Example 18 | 0.2 | 0.5 | 40 | 0.2 | 0.6 | 10 | 90 | G |
| Reference Example 19 | 0.4 | 2 | 40 | 0.4 | 0.7 | 33 | 95 | G |
| Reference Example 20 | 0.4 | 2 | 40 | 0.4 | 0.6 | 32 | 96 | G |
| Reference Example 21 | 0.2 | 2 | 40 | 0.2 | 0.7 | 35 | 95 | G |
| Reference Example 22 | 0.2 | 2 | 40 | 0.2 | 0.6 | 33 | 95 | G |
| Comparative Example 1 | 0 | 0 | 40 | Not detected | 0.5 | 0 | 75 | NG |
| Comparative Example 2 | 0 | 0 | 40 | Not detected | 0.4 | 0 | 70 | NG |
| Comparative Example 3 | 0 | 0 | 40 | Not detected | 0.3 | 0 | 65 | NG |
| Comparative Example 4 | 1 | 1 | 40 | 1 | 0.5 | 27 | 74 | NG |
| Comparative Example 5 | 1 | 1 | 40 | 1 | 0.4 | 38 | 69 | NG |
| Comparative Example 6 | 1 | 1 | 40 | 1 | 0.3 | 31 | 66 | NG |
| Comparative Example 7 | 0.2 | 5 | 1 | 0.6 | 0.5 | 30 | 72 | NG |
| Comparative Example 8 | 0.2 | 5 | 1 | 0.5 | 0.4 | 28 | 70 | NG |
| Comparative Example 9 | 0.2 | 5 | 1 | 0.5 | 0.3 | 30 | 67 | NG |
| Comparative Example 10 | 0.6 | 1 | 40 | 0.6 | 0.5 | 28 | 74 | NG |

TABLE-continued

| | Dielectric body Mg contained (mol) | Inner electrodes Mg content of common material (mol) | Process Rate of temperature increase (° C./sec) | Dielectric layers Mg detected (parts by mole) | Inner electrodes | | Characteristics Coverage (%) | Result |
|---|---|---|---|---|---|---|---|---|
| | | | | | Thickness (μm) | Proportion of defects where Mg segregation detected | | |
| Comparative Example 11 | 0.6 | 1 | 40 | 0.6 | 0.4 | 31 | 70 | NG |
| Comparative Example 12 | 0.6 | 1 | 40 | 0.6 | 0.3 | 27 | 65 | NG |
| Comparative Example 13 | 0.2 | 0.5 | 40 | 0.2 | 0.5 | 10 | 76 | NG |
| Comparative Example 14 | 0.2 | 0.5 | 40 | 0.2 | 0.4 | 8 | 71 | NG |
| Comparative Example 15 | 0.2 | 0.5 | 40 | 0.2 | 0.3 | 9 | 65 | NG |

Table summarizes Examples, Reference Examples, and Comparative Examples. As can be seen from Comparative Examples 1 to 3 and 13 to 15 in Table, combinations of a proportion of Mg-containing defects in inner electrodes of less than approximately 20% and an inner electrode thickness of approximately 0.5 μm or less generally resulted in low coverages even when the quantity of Mg detected in dielectric layers was approximately 0.4 parts by mole or less and, more importantly, even when the quantity of detected Mg was approximately 0 parts by mole.

As can be seen from Comparative Examples 4 to 6 and 10 to 12, more than approximately 0.4 parts by mole of Mg detected in dielectric layers generally resulted in low inner electrode coverages even when the proportion of Mg-containing defects in inner electrodes was approximately 20% or more. As indicated in Comparative Examples 7 to 9, furthermore, slow temperature increase during the firing of the multilayer body also led to a low coverage. This is presumably because the long period of temperature increase allowed Mg in the electrode common material and Ni to diffuse in the element to such an extent that more defects occurred in inner electrodes.

As demonstrated in Examples 1 to 18, combinations of a proportion of Mg-containing defects in inner electrodes of approximately 20% or more and approximately 0.4 parts by mole or less Mg detected in dielectric layers resulted in good coverages even when the thickness of inner electrodes was approximately 0.5 μm or less.

Any other production method should also provide multilayer ceramic capacitors with similar characteristics as long as specified conditions are met.

As can be seen from Reference Examples 1 to 22 in Table, any thickness of inner electrodes exceeding approximately 0.5 μm leads to a good coverage regardless of the Mg content and other parameters, because it is unlikely that defects occur in such inner electrodes. The advantages of the present invention are therefore significant when the thickness of inner electrodes is approximately 0.5 μm or less.

Figure 5:
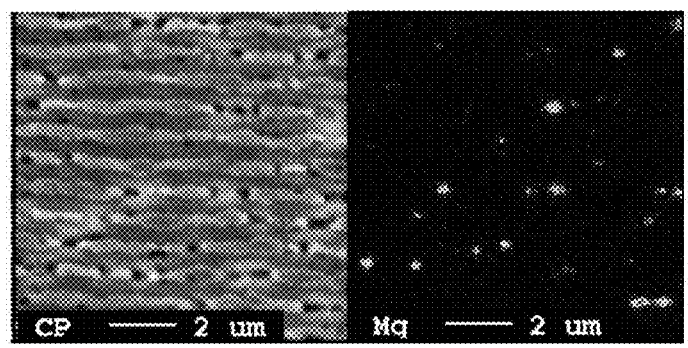
FIG. 5 is a WDX image and a mapping of dielectric layers and inner electrodes of a multilayer ceramic capacitor used in an Example.

A WDX image and a mapping representing the state of the dielectric element and inner electrodes in Example 4 are given in FIG. 5 for reference purposes. FIG. 5 demonstrates the presence of Mg in defects in inner electrodes.

Figure 6:
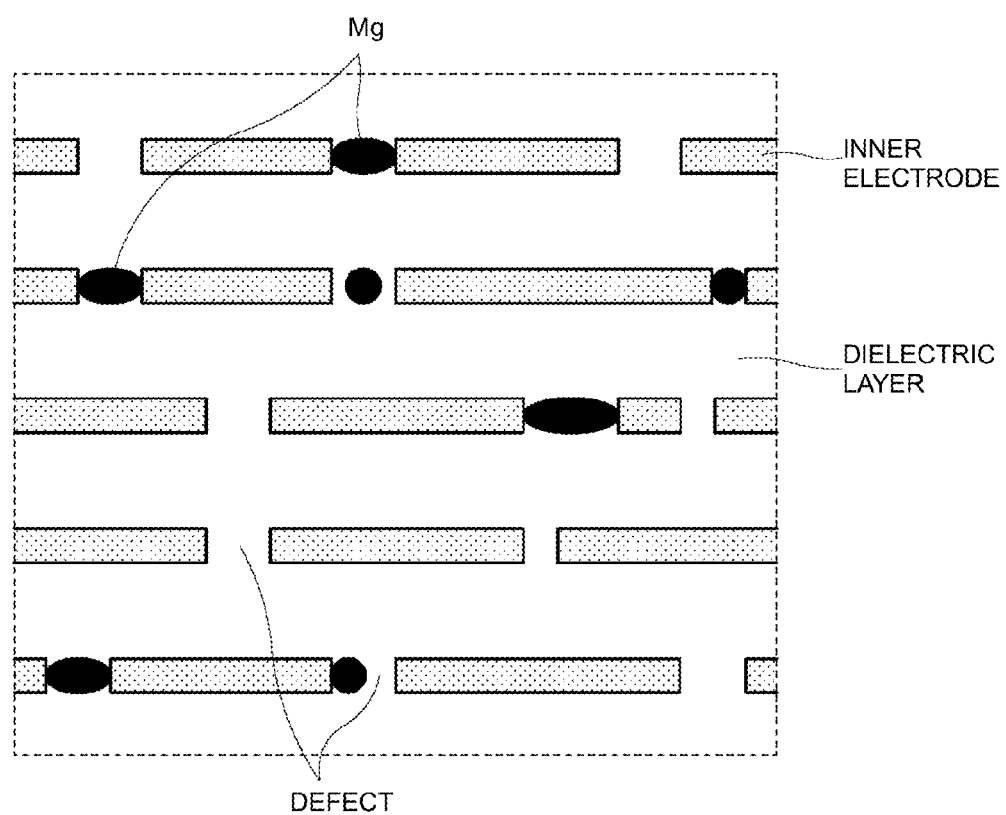
FIG. 6 is a schematic diagram illustrating defects in internal electrodes of a multilayer ceramic capacitor and Mg existing in some defects.

FIG. 6 is a schematic diagram illustrating defects in inner electrodes and Mg existing in some defects. In FIG. 6, Mg exists in 7 out of 14 defects.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic capacitor comprising:
    a plurality of dielectric layers containing a perovskite compound containing Ba and Ti; and
    a plurality of inner electrodes containing Ni as an electroconductive material and a common material, each inner electrode of the plurality of inner electrodes being located in a respective interface between adjacent dielectric layers of the plurality of dielectric layers, wherein
    an average thickness of the inner electrodes is 0.5 μm or less,
    a first Mg content of the dielectric layers is in a range of 0 parts by mole≤Mg≤0.4 parts by mole based on a total of 100 parts by mole of Ti in the dielectric layers,
    a second Mg content in the common material of the inner electrodes is in a range of 1 to 5 parts by mole based on a total of 100 parts by mole of Ti in the inner electrodes, and
    Mg is present in defects defined by regions where an inner electrode is discontinuous, a proportion thereof is expressed as follows:

the number of the defects in which the Mg is present/the total number of the defects×100%≥approximately 20%.

2. The multilayer ceramic capacitor according to claim 1, wherein the perovskite compound further contains Zr and Hf, and
    the Mg content of the dielectric layers is in a range of 0 parts by mole≤Mg≤0.4 parts by mole based on a total of 100 parts by mole of Ti, Zr, and Hf.

3. The multilayer ceramic capacitor according to claim 1, wherein adjacent inner electrodes respectively extend to opposite end faces of the multilayer ceramic capacitor.

4. The multilayer ceramic capacitor according to claim 3, further comprising an outer electrode on each end face of the multilayer ceramic capacitor and coupled to the inner electrodes extended thereto.

5. The multilayer ceramic capacitor according to claim 1, wherein the Ti content of the common material is 3 parts by mole to 100 parts by mole of Ni in the inner electrodes.

* * * * *